United States Patent
Cira et al.

(10) Patent No.: US 10,527,193 B2
(45) Date of Patent: Jan. 7, 2020

(54) ELASTOMERIC FOCUSING VALVES

(71) Applicant: The Board of Trustees of the Leland Stanford Junior University, Palo Alto, CA (US)

(72) Inventors: Nate Cira, Stanford, CA (US); Stephen R Quake, Stanford, CA (US); Michael Robles, Mountain View, CA (US); Jason Khoo, East Palo Alto, CA (US)

(73) Assignee: The Board of Trustees of the Leland Stanford Junior University, Redwood City, CA (US)

( * ) Notice: Subject to any disclaimer, the term of this patent is extended or adjusted under 35 U.S.C. 154(b) by 52 days.

(21) Appl. No.: 15/589,477

(22) Filed: May 8, 2017

(65) Prior Publication Data
US 2017/0321821 A1    Nov. 9, 2017

Related U.S. Application Data

(60) Provisional application No. 62/332,651, filed on May 6, 2016.

(51) Int. Cl.
*F16K 99/00*    (2006.01)

(52) U.S. Cl.
CPC ...... *F16K 99/0044* (2013.01); *F16K 99/0026* (2013.01); *F16K 2099/0084* (2013.01); *F16K 2099/0094* (2013.01)

(58) Field of Classification Search
CPC .............. F16K 99/0015; F16K 99/0044; F16K 99/0026; F16K 2099/0094; F16K 2099/0084; B01L 3/502738
See application file for complete search history.

(56) References Cited

U.S. PATENT DOCUMENTS

| | | | |
|---|---|---|---|
| 6,626,416 B2* | 9/2003 | Sharma | F15C 5/00 251/129.06 |
| 6,899,137 B2* | 5/2005 | Unger | B01L 3/502707 137/565.16 |
| 9,435,490 B2* | 9/2016 | Galas | B01L 3/502738 |

(Continued)

OTHER PUBLICATIONS

MEMS 2008, Tucson, AZ, USA, Jan. 13-17, 2008; "A Piezoelectrically-Driven High Flow Rate Axial Polymer Microvalve With Solid Hydraulic Amplification".

(Continued)

*Primary Examiner* — Eric Keasel
(74) *Attorney, Agent, or Firm* — Lumen Patent Firm (57) ABSTRACT

A fluid valve is provided that includes a first planar substrate having a smooth surface or a surface with features, an elastomer disposed on the first substrate, a second planar substrate disposed on another side of the elastomer, where the second substrate has a smooth surface or features, where the first and second substrate are more rigid than the elastomer, where the first substrate, the second substrate or the elastomer has a fluid channel, where the channel is open when the first or second substrate are in a first thermal state or a first compression state, where the channel is closed or partially closed when the first or second substrate are in a second thermal state or a second compression state, where the second thermal state is a different temperature than the first thermal state, where the second compression state is a different pressure than the first compression state.

6 Claims, 5 Drawing Sheets

(56) References Cited

U.S. PATENT DOCUMENTS

| | | | |
|---|---|---|---|
| 2009/0095927 A1* | 4/2009 | McCarthy | F16K 31/002 251/11 |
| 2011/0240127 A1 | 10/2011 | Eberhart et al. | |
| 2013/0139899 A1 | 6/2013 | Galas et al. | |
| 2015/0028235 A1* | 1/2015 | Ichiki | F16K 99/0026 251/11 |
| 2015/0276089 A1 | 10/2015 | Unger | |

OTHER PUBLICATIONS

Journal of Micromechanics and Microengineering 15 (2005) 1831-1839; "Micro throttle pump employing displacement amplification in an Elastorseric Substrate".

Lab on a Chip "A versatile technology for droplet-based microfluidics: thermomechanical actuation", 2015, 15, 2133, Mar. 2015.

Journal of Microelectromechanical Systems, vol. 16, No. 1 "A Thermally Responsive PDMS Composite and Its Microfluidic Applications", Feb. 2009.

* cited by examiner

*FIG. 1A* — Open State

*FIG. 1B* — Closed, or Partially Closed State

*FIG. 1C* — Open State

*FIG. 1D* — Closed, or Partially Closed State

Cross section of rigid Layer with indentations or protrusions

FIG. 6A

Cross section of elastomeric Layer with indentations or protrusions

ELASTOMERIC FOCUSING VALVES

CROSS-REFERENCE TO RELATED APPLICATIONS

This application claims priority from U.S. Provisional Patent Application 62/332,651 filed May 6, 2016, which is incorporated herein by reference.

FIELD OF THE INVENTION

The present invention relates generally to fluidic valves. More particularly, the invention relates to fluidic valves having thermally or mechanically actuated elastomer material to obstruct one or more fluidic channels.

BACKGROUND OF THE INVENTION

Handling and manipulating small quantities of liquids are fundamental challenges in modern biology. Microfluidic technologies have offered means to reduce sample and reagent consumption while increasing automation. Critical to realizing these goals are integrated valves, which enable routing, pumping, and isolation of submicroliter volumes of liquid. Most current valves are pneumatically actuated and require pressure tanks, regulators, and off-chip solenoid valves to control on-chip fluid manipulation.

Attempts have been made to eliminate the external control required for pneumatic valves. These include efforts to develop thermally actuated valves using thermally deflecting materials or bimetals and locally patterned thermally expansive materials including wax, plastic, gas, liquid, hydrogels, and composites. Previous efforts have not been widely adopted because they were one-time use valves, involved complex many-step fabrication processes, were greater than millimeter scale, were not rigorously tested, thoroughly characterized, or multiplexed, took greater than 5 seconds to actuate, were not amenable to high throughput manufacturing, or did not completely close.

What is needed is a device that enables complex liquid handling without the expensive, bulky, and high power consumption external equipment required by pneumatic systems.

SUMMARY OF THE INVENTION

To address the needs in the art, a fluid valve is provided that includes a first planar substrate, where the first planar substrate has a smooth surface or a surface with indentations or protrusions, a first side of a planar elastomer layer disposed on the first planar substrate, a second planar substrate disposed on a second side of the planar elastomer layer, wherein the first side of the planar elastomer layer and the second side of the planar elastomer layer have a smooth surface or a surface having indentations or protrusions, where the second planar substrate has a smooth surface or a surface having indentations or protrusions, where the first planar substrate and the second planar substrate are more rigid than the planar elastomer layer, where at least one of the first planar substrate, the second planar substrate or the planar elastomer layer has a fluid channel, where the fluid channel is open when the first planar substrate or the second planar substrate are in a first thermal state or a first compression state, where the fluid channel is closed or partially closed when the first planar substrate or the second planar substrate are in a second thermal state or a second compression state, where the second thermal state is a different temperature than the first thermal state, where the second compression state is a higher pressure than the first compression state.

According to one aspect of the invention, the first planar substrate or the second planar substrate have a pattern of resistors, where the resistors are disposed to provide local heating with application of a voltage, where the planar elastomer layer is placed in a locally expanded state according to the local heating, where the fluid channel is filled with material from the elastomer layer. In one aspect, the resistors can include indium tin oxide resistors, printed carbon resistors, etched thin film resistors, or resistive alloy resistors.

According to a further aspect of the invention, the elastomer layer includes a silicone such as polydimethylsiloxane, a urethane, or a fluoroelastomer, a fluorosilicone, a rubber, or a thermoplastic elastomer.

In another aspect of the invention, the second compressive state includes a displacement of i) the first planar substrate, ii) the second planar substrate, iii) the elastomer layer, or any combination of i), ii), and iii).

According to one aspect of the invention, the second compressive state is induced by an actuator that can include a liquid crystal elastomer, piezoelectric actuator, or electroactive polymer.

In yet another aspect of the invention, the first planar substrate or the second planar substrate can include glass, plastic, fiberglass, metals, silicon, ceramics, quartz, or a material that is stiffer than the planar elastomer layer.

According to one aspect of the invention, the second thermal state is induced according to a resistive heating element, application of spatially patterned light, spatially patterned absorptive material in combination with non-patterned light, direct contact of a hot item, a channel containing a heated fluid, or a channel containing an exothermic chemical reaction.

In another aspect of the invention the second thermal state is induced by patterned cooling.

According to a further aspect of the invention, the first state and said second state are reversible states.

DETAILED DESCRIPTION

Thermoelectric valves are poised to deliver on long sought promises of microfluidic technologies. The valves according to the current invention offer massive reductions in cost, power consumption, and required equipment while maintaining sophisticated automation compared to current valve types. The current invention provides valves that have performance characteristics similar to existing "gold standard" pneumatic microfluidic valves with orders of magnitude less power, lower cost, and less external equipment.

A fluid valve is provided that includes a first planar substrate, where the first planar substrate has a smooth surface or a surface with indentations or protrusions, a first side of a planar elastomer layer disposed on the first planar substrate, a second planar substrate disposed on a second side of the planar elastomer layer, wherein the first side of the planar elastomerer layer and the second side of the planar elastomer layer have a smooth surface or a surface having indentations or protrusions, where the second planar substrate has a smooth surface or a surface having indentations or protrusions, where the first planar substrate and the second planar substrate are more rigid than the planar elastomer layer, where at least one of the first planar substrate, the second planar substrate or the planar elastomer layer has a fluid channel, where the fluid channel is open when the first planar substrate or the second planar substrate are in a first thermal state or a first compression state, where the fluid channel is closed or partially closed when the first planar substrate or the second planar substrate are in a second thermal state or a second compression state, where the second thermal state is a higher temperature than the first thermal state, where the second compression state is a higher pressure than the first compression state.

According to one embodiment, the invention includes a device that has a thermally expansive elastomer material placed between two more rigid materials, where channels are patterned into one or more of the layers and localized heat is applied, for example using a resistive heating element, causing the thermally expansive elastomer material to expand and obstruct one or more of the channels.

In another embodiment, the invention includes a device that has a thermally expansive elastomer material placed between two more rigid materials, where channels are patterned into one or more of the layers and mechanical pressure is applied to the rigid materials or to the elastomer material to force the elastomer material to fill the channels.

Some exemplary applications of the invention include point-of-care diagnostics, such as at-home and bedside systems, low-cost, portable nucleic acid and other biological sample preparation systems, automated surveillance devices, food quality testing, the monitoring of plant and livestock pathogens, in-field typing of organisms and agents, and chemical analysis systems.

The current invention eliminates the pressure source, pressure regulators, control channels and ports, solenoid valves, air lines, and reduces power consumption compared to existing valves. Systems using the current invention are benefited by portability, lowered power consumption, and reduced cost, thus enabling them to compete in existing applications, but more importantly enabling access to a wide range of applications which were previously inaccessible.

In one embodiment, the invention includes a lower glass layer (first planar substrate) with patterned indium tin oxide resistors, the resistors causing local heating with application of a voltage, a layer of polydimethylsiloxane (the thermally expansive elastomer layer), a layer of polystyrene (second planar substrate) including pattered channels.

Other embodiments include channels that are located in the thermally expansive elastomer material. One or more of the rigid layers are glass in other embodiments. Other embodiments can include the following materials list for the rigid layers: glass, plastic, fiberglass (for example, a circuit board), stiffer elastomers, metals, silicon, ceramics, quartz, and potentially any material stiffer than the elastomer used.

Methods for making channels can include: hot embossing, soft lithography, injection molding, die cutting, xurography, laser cutting, 3D printing, stamping, etching, photolithography, micromachining, water jet cutting, deep reactive ion etching, abrasive blasting, and electron-beam lithography.

Methods for local heat application can include patterning and selective application of voltage across a resistive heating element, the application of spatially patterned light, the application of a local heat source through direct contact of a hot item, such as the tip of a soldering iron, the proximity of the locally heated area to a channel containing fluid of higher temperature, and the proximity of the channel to a chemical reaction, which generates heat.

The invention can further include multiple valves that are controlled independently to enable more complex fluid handling; for example three valves can be placed in sequence and actuated to create a peristaltic pump. Valves can be partially closed to achieve a sieve valve, useful for filtering. Further, the valves can be closed to isolate a section of fluid, the valves can be actuated in sequence to route fluids to desired locations, the valves can be controlled in series or parallel to enable multiplexing with reduced input electrical lines, or on-chip logic can be implemented to reduce input electrical lines while enabling more valves to be addressed independently. In another embodiment, a voltage can be applied in different patterns to valves to optimize closing, back pressure, and opening characteristics. Local heating on the device can be used for other purposes as well, such as promoting chemical or biochemical reactions or drying materials. According to one embodiment, a coating is applied to any of the layers to modify their properties, for instance to prevent migration of molecules into the bulk material, prevent adsorption to the surfaces, or to reduce evaporation.

Dead-end loading can be achieved by pressurizing fluid into a closed valve.

Valves can be actuated to create displacements directly, or control hydraulics which propel devices.

Reagents can be dried or preloaded in the liquid state into devices. The valves can be used to move or release reagents from storage chambers into other portions of the device, to run reactions, or out of the device, for example, to deliver a therapeutic agent.

Valves can be powered wirelessly with inductive coupling.

In further embodiments, the invention includes the implementation of multilayer channel architectures which allow logic to be performed in the fluidic layer, stacking fluidic channels to multiplex control, including additional layers with more channels, modulation of channel geometry such that different channels or sections of channels close or remain open under application of a given amount of heat, and optional access ports to the channels allow addition of fluid.

In other embodiments, preprogramed sequences of valve actuation can be used to execute standard protocols, or sensors can be integrated to measure and record assay outputs, or modify program sequence with feedback. In a further embodiment, the valves can be powered and controlled by phone or another mobile device. The modulation of the valve closing area can be accomplished through the application of more or less heat, where the use of the modulation of the valve closing area is useful to meter liquids. In another embodiment, multiplexed addressing of some number of multiple independent channels is enabled with a smaller number of electrical inputs, the toggling of a valve open and closed can be used to enhance mixing, where these examples can be in combination with pneumatic control, or any combination of the above mentioned extensions.

The invention described herein is for a new type of actuation mechanism, which enables complex liquid handling without the expensive, bulky, and high power consumption external equipment required by pneumatic systems. Compared to previous valve actuation mechanisms, this new valve actuation mechanism operates by a different mechanism and is fabricated in a new way. This new valve type and manufacturing process results in robust, well characterized, fast, and small or large valves which can hold high pressure and be easily and cost effectively manufactured; enabling portable fluidic control.

According to the current invention, a valve is provided that includes a thermally expansive elastomer material layer placed between two more rigid material layers, where channels are patterned into one or more of the layers and localized heat is applied, for example by a resistive heating element, causing the thermally expansive elastomer material to expand and obstruct one or more of the channels.

In one embodiment, the lower rigid layer and/or the upper rigid layer, for example glass or polystyrene layers, include patterned resistors, such as indium tin oxide resistors, printed carbon resistors, etched thin film resistors, etc., where the resistors locally heat the device by application of a voltage, and a thermally expansive elastomer layer, for example polydimethylsiloxane (PDMS) is disposed between the lower rigid layer and an upper rigid layer, where the either rigid layer or the elastomer layer also includes a pattern of channels.

Figure 1A:
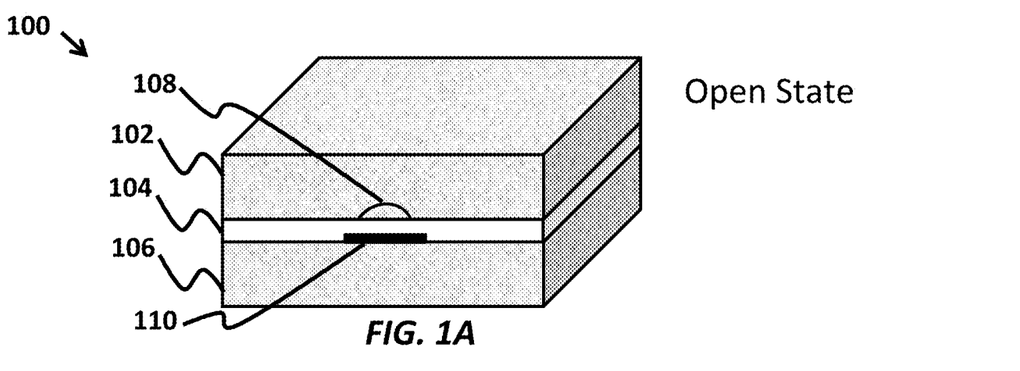
FIGS. 1A-1D show embodiments of the fluidic valve according to the current invention.
Figure 1B:
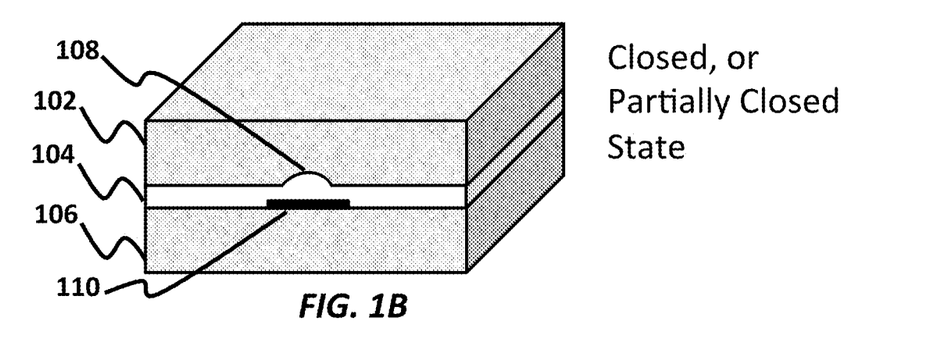

FIGS. 1A-1B show embodiments of the fluidic valve 100 according to the current invention, where FIG. 1A shows the fluidic valve 100 having a top rigid plate 102, a thermally or mechanically actuated elastomer layer 104, and a bottom rigid plate 106, where the elastomer layer 104 is disposed between the top rigid plate 102 and the bottom rigid plate 106. In these embodiments, the top rigid plate includes a fluid channel 108 disposed at the top rigid plate surface that interfaces the elastomer layer 104, and the bottom rigid plate 106 includes a heating element 110 disposed on the bottom rigid plate surface that interfaces the elastomer layer 104. FIG. 1A shows the fluidic valve 100 having the channel 108 in an open state. FIG. 1B shows the fluidic valve 100 in a closed or partially closed state when the heating element 110 is actuated according to the amount of heat provide by the heating element 110, where the elastomer layer 104 expands under the added heat to fill or partially fill the fluidic channel 108, as shown in FIG. 1B. Here and throughout the disclosure, it is understood that the fluidic channel 108 and/or the heating element 110 can be disposed in the top rigid plate 102, the elastomer layer 104, and/or the bottom rigid plate 106.

Figure 1C:
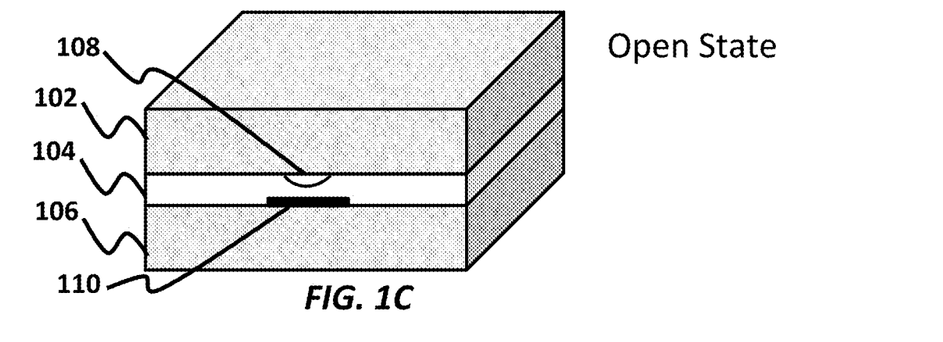
Figure 1D:
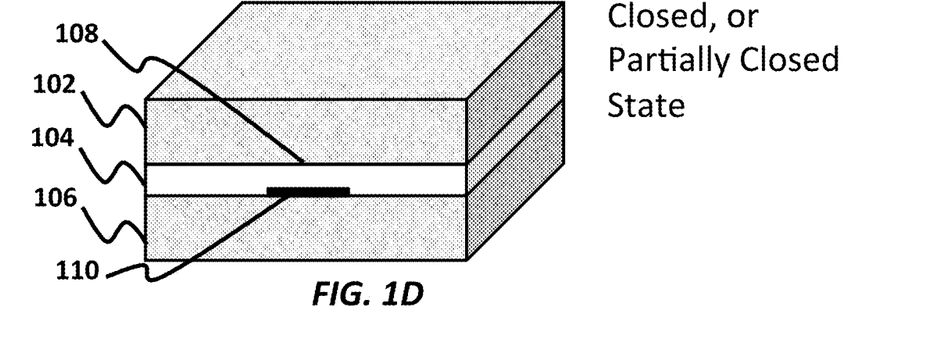

FIGS. 1C-1D show another embodiment of the fluidic valve 100, where the channel 108 is disposed in the elastomer layer 104, as shown in FIG. 1C. As the heating element 110 heats the elastomer layer 104, the channel 108 becomes closed or partially closed according to the amount of heat provide by the heating element 110.

Figure 2A:
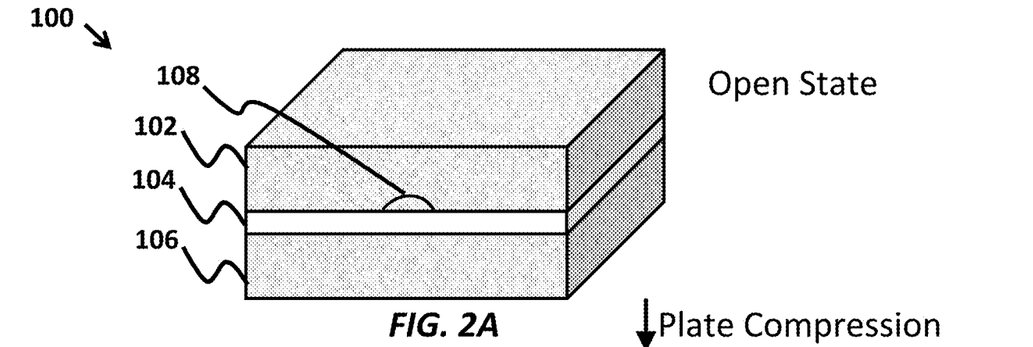
FIGS. 2A-2D show embodiments of the fluidic valve according to the current invention.
Figure 2B:
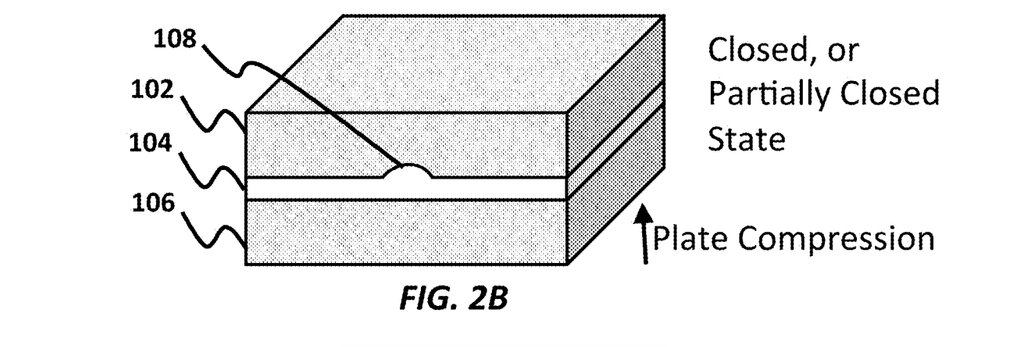

FIGS. 2A-2B show further embodiments of the invention, where FIG. 2A shows the fluidic valve 100 in an open state. As shown, the fluidic channel 108 is disposed in the top rigid plate 102, at the interface with the elastomer layer 104. The top rigid plate 102, and/or the bottom rigid plate 106 are moveable plates configured to compress the elastomer layer 104 and displace the elastomer layer 104 into the fluidic channel 108 to close or partially close the fluidic valve 100, as shown in FIG. 2B.

Figure 2C:
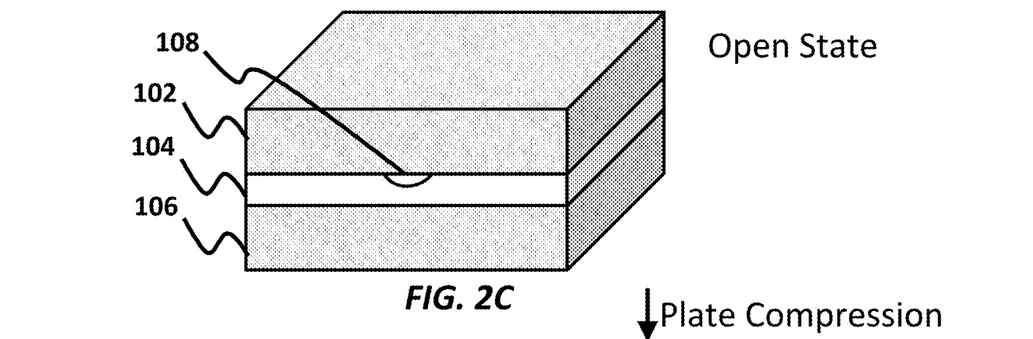
Figure 2D:
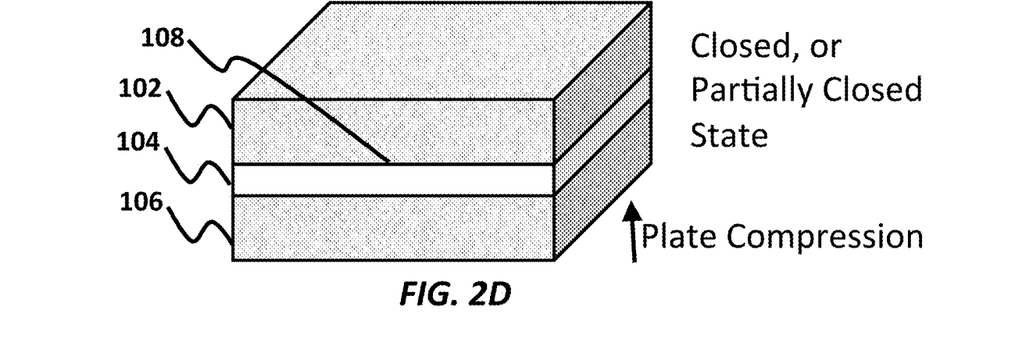

FIGS. 2C-2D show another embodiment of the invention, where FIG. 2C shows the fluidic valve 100 in an open state. As shown, the fluidic channel 108 is disposed in the elastomer layer 104, at the interface with the top rigid plate 102. The top rigid plate 102, and/or the bottom rigid plate 106 are moveable plates configured to compress the elastomer layer 104 and displace the elastomer layer 104 and compress the fluidic channel 108 to close or partially close the fluidic valve 100, as shown in FIG. 2D.

Figure 3A:
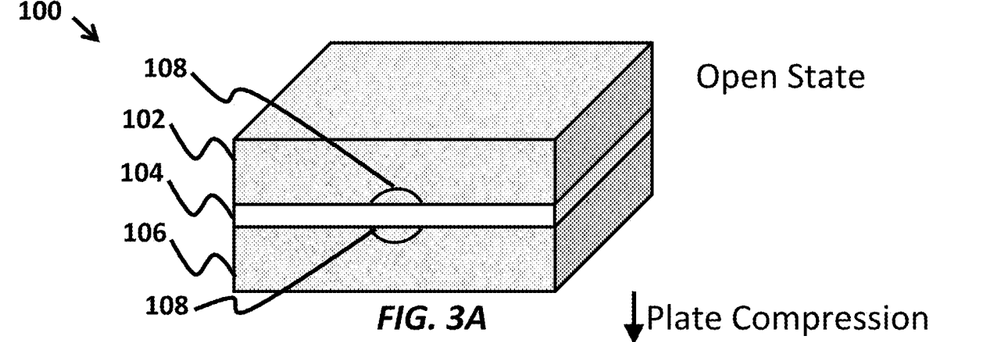
FIGS. 3A-3H show embodiments of the fluidic valve according to the current invention.
Figure 3B:
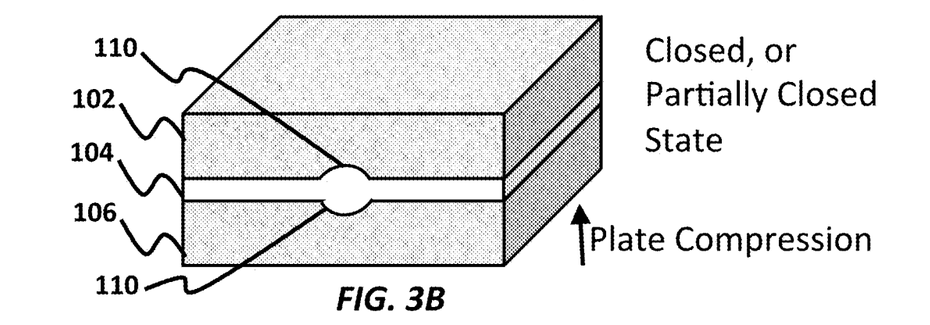

FIGS. 3A-3B show further embodiments of the invention, where FIG. 3A shows the fluidic valve 100 in an open state. As shown, the fluidic channel 108 is disposed in the top rigid plate 102, and in the bottom rigid plate 106, where the fluidic channels 108 are disposed at the rigid plate (102/106) interface with the elastomer layer 104. The top rigid plate 102, and/or the bottom rigid plate 106 are moveable plates configured to compress the elastomer layer 104 and displace the elastomer layer 104 into the fluidic channels 108 to close or partially close the fluidic valve 100, as shown in FIG. 3B.

Figure 3C:
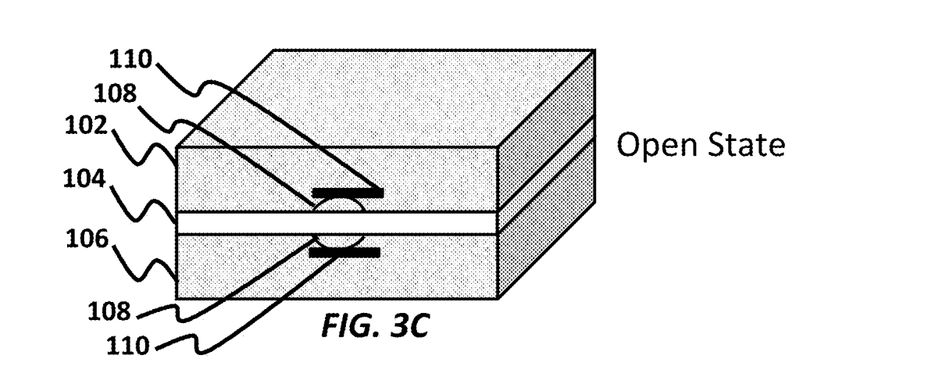
Figure 3D:
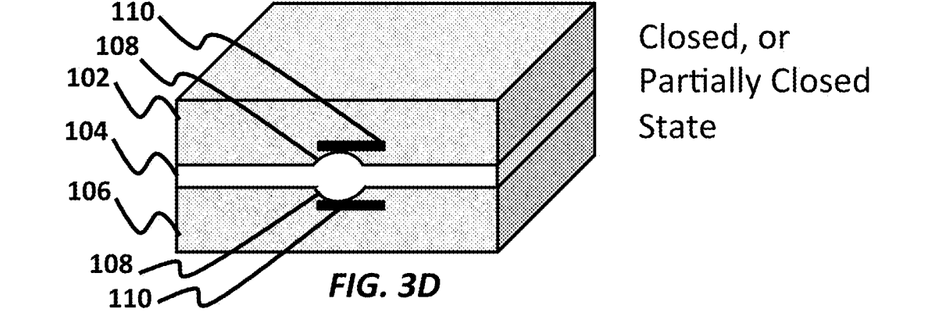
Figure 3E:
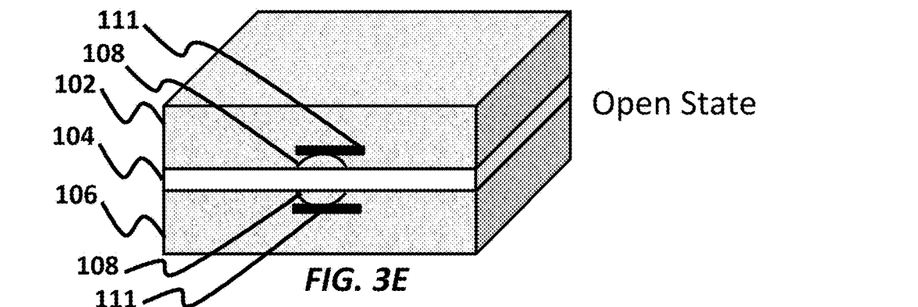
Figure 3F:
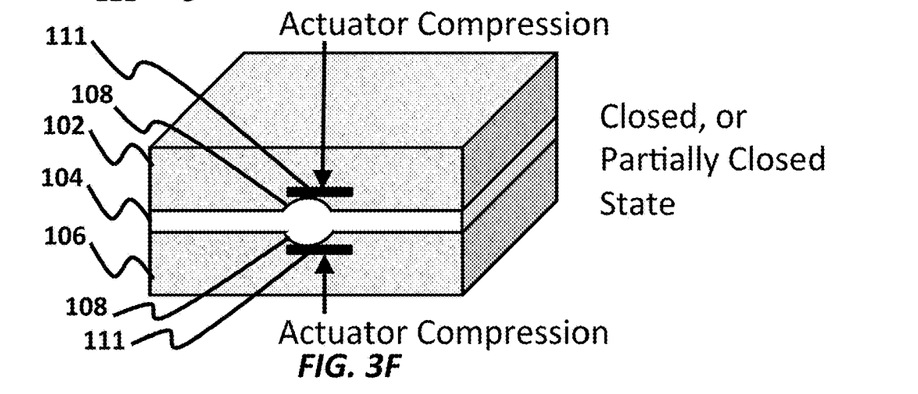
Figure 3G:
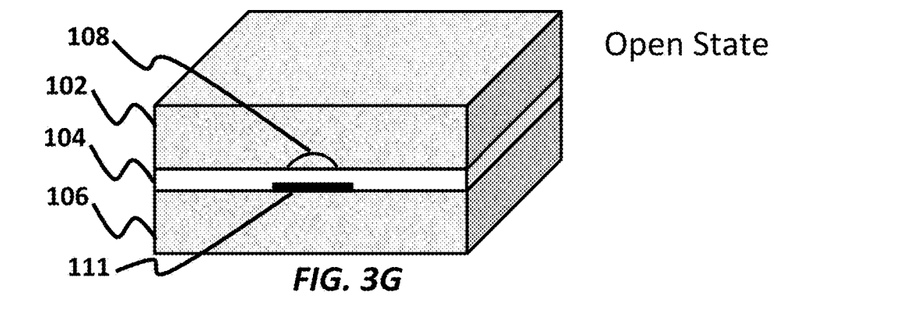
Figure 3H:
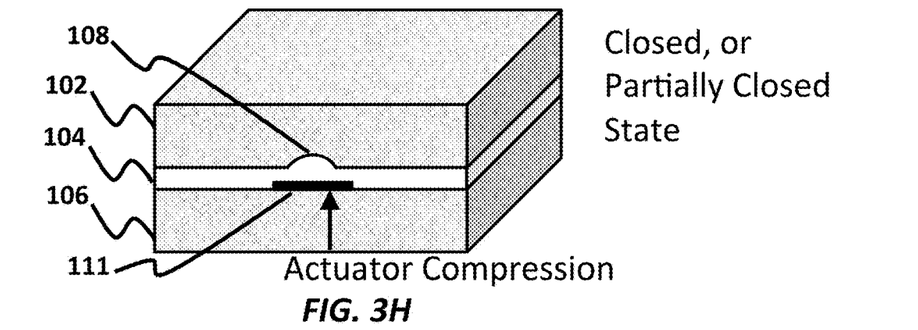

FIGS. 3C-3H show embodiments of the fluidic valve 100 according to the current invention, where FIG. 3C shows the fluidic valve 100 having a top rigid plate 102, a thermally expansive or mechanically actuated elastomer layer 104, and a bottom rigid plate 106, where the elastomer layer 104 is disposed between the top rigid plate 102 and the bottom rigid plate 106. In these embodiments, the top rigid plate 102 and the bottom rigid plate 106 include a fluid channel 108 disposed at the rigid plate surfaces that interface the elastomer layer 104. Further shown, the top rigid plate 102 and the bottom rigid plate 106 include heating elements 110 disposed on the rigid plate surfaces that interface the elastomer layer 104. FIG. 3C shows the fluidic valve 100 having the channels 108 in an open state. FIG. 3D shows the fluidic valve 100 in a closed or partially closed state when the heating elements 110 are actuated according to the amount of heat provide by the heating elements 110, where the elastomer layer 104 expands under the added heat to fill or partially fill the fluidic channels 108, as shown in FIG. 3D. FIGS. 3E and 3F show a further embodiment of the invention that includes pressure actuators 111 embedded in the top rigid plate 102 and the bottom rigid plate 106, where FIG. 3E shows the valve in an open state, and FIG. 3F shows the valve in a closed or partially closed state according to actuation of the pressure actuator. FIGS. 3G and 3H show another embodiment of the invention, where the pressure actuator 111 is embedded in the elastomeric layer 104, where FIG. 3G shows the valve in an open state, and FIG. 3H shows the valve in a closed or partially closed state according to actuation of the pressure actuator.

Regarding the embodiments having heating elements, the rigid plates 102/106 are rigid plates with electrically conductive paths. When a voltage is applied to the electrically conductive paths on the rigid plates 102/106, for example across a pattern of resistors, local Joule heating occurs. The thermally expansive elastomer layer 104 adjacent to the local heating increases in temperature and expands. This expansion blocks, or partially blocks the fluidic channel, creating a closed or partially closed valve. Once the voltage is removed, the local heat dissipates and the thermally expansive elastomer returns to its initial flat state, returning the valve to its initial open state.

In another aspect of the invention the second thermal state is induced by patterned cooling.

According to a further aspect of the invention, the first state and said second state are reversible states.

According to other aspects of the invention, the fluidic channels can be patterned in the rigid layers from a mold created by photolithography. For example, a photomask is obtained that resembles the desired image of the mold. The mold is made by placing a silicon wafer in a sealed container containing a separate beaker of hexamethyldisilazane (HMDS) adhesion promoter for 5 minutes. Vapor adsorption results in an HMDS coating the wafer surface. Photoresist (Megaposit™ SPR 220.7) is then poured onto a silicon wafer. The silicon wafer is placed in a spinner and spun for 5 seconds at 500 rotations per minute before increasing to 1750 rotations per minute for an additional 30 seconds. This produces a layer of photoresist approximately 9-12 micrometers thick. The silicon wafer is then placed on a hot plate at 90 degrees Celsius which is ramped up to 120 degrees Celsius. Once the hot plate reaches 120 degrees Celsius, the silicon wafer is left on for 90 seconds. The silicon wafer is then allowed to cool for a few minutes before being placed under the photomask in a photomask aligner and exposure machine. The silicon wafer is exposed to ultraviolet radiation in two doses of 30 seconds each time with 30 seconds of non-exposure between the two doses, for a total dose of 700 mJ per $cm^2$. The silicon wafer is then placed in a beaker of positive photoresist developer and agitated until the exposed photoresist is developed away, leaving the unexposed photoresist. The silicon wafer is then washed with deionized water, blown dry with pressurized air, and placed back into the beaker of photoresist developer for 10-15 seconds to remove any residual exposed photoresist. The silicon wafer is subsequently removed from the beaker of photoresist developer, washed with deionized water, blown dry with pressurized air, and placed on a hot plate at 65 degrees Celsius that ramps at a rate of 10 degrees Celsius per hour to a final temperature of 190 degrees Celsius. The silicon wafer is removed from the hot plate 15 hours after it is first placed on the hot plate. The silicon wafer is then trimmed to a desired size by scoring with a diamond tipped pen and breaking along the score marks, becoming the mold.

As an example for embossing the channels, a layer of polystyrene plastic around 1 mm thick is then clamped using a flat backed substrate onto the patterned side of the mold at 10 psi and placed in an oven at 150 degrees Celsius. The polystyrene layer is left clamped to the mold in the oven for 5 minutes before the oven temperature is lowered to 90 degrees Celsius. Once the oven temperature reaches 90 degrees Celsius, the polystyrene layer is removed from the mold, leaving an imprint of the mold features in the polystyrene sheet. Then, the polystyrene layer is cut to the desired polystyrene chip size, the sides are trimmed to ensure the polystyrene chip lies flat, and ports are drilled through the polystyrene to allow access to the flow channels.

As an example for casting the elastomer layer, a silicon wafer is placed in a vacuum-sealed container with a beaker of chlorotrimethylsilane for 10 minutes. This ensures the silicon wafer gets an even coating of chlorotrimethylsilane. The chlorotrimethylsilane forms a hydrophobic layer on the silicon wafer, which prevents polydimethylsiloxane (PDMS) from sticking to the silicon wafer in the next step. Next a well-mixed and degassed mixture of 1 part crosslinker to 10 parts base PDMS (RTV615) is poured onto the silicon wafer. The silicon wafer is placed in a spinner and spun at 400 rotations per minute for 1 minute and 15 seconds for a final thickness of around 110 The PDMS coated silicon wafer is subsequently placed on a flat surface for 30 minutes before being placed in an oven at 80 degrees Celsius for 1 hour.

According to one embodiment, the elastomer layer 104 is bonded to the rigid plates (102/106). Once the PDMS coated silicon wafer has been removed from the oven and cooled to room temperature, it and the polystyrene chip are placed PDMS-side up and channel side up, respectively, in a machine and plasma oxidized (35 seconds exposure at 80 watts). Next, the PDMS coated silicon wafer is coated with 2% (3-Aminopropyl)triethoxysilane (APTES) in water solution for 20 minutes. Concurrently, the polystyrene chip is treated with a 2% (3-Glycidyloxypropyl)trimethoxysilane (GPTS) in water solution for 20 minutes. After 20 minutes the silicon wafer and the chip are washed with DI water and blown dry with pressurized air. The patterned side of the polystyrene chip is placed against the PDMS coated silicon wafer, and the assembly is placed in an oven at 80 degrees Celsius for 2 or more hours. This completes the bonding of the polystyrene chip and the PDMS layer on the PDMS coated silicon wafer. The assembly is then removed from the wafer by slicing through the PDMS around the polystyrene chip with a scalpel and peeling the polystyrene chip and the area of the PDMS bonded to it from the wafer.

For the embodiments that include patterns of the electrodes and heating elements 110 (see FIGS. 4-5), a photomask is obtained that resembles the desired image of the patterned resistors, where the heating elements 110 can include indium tin oxide resistors, printed carbon resistors, etched thin film resistors. In one embodiment, a patterned glass layer is fabricated by placing an indium tin oxide (ITO) coated glass slide in a sealed container with a beaker of HMDS for 5 minutes. This ensures the glass slide gets an even coating of HMDS on its surface. Photoresist is then poured onto the ITO coated side of the glass slide. The glass slide is placed in a spinner and spun for 5 seconds at 500 rotations per minute before increasing to 1800 rotations per minute for an additional 30 seconds for a final thickness of 9 µm. The glass slide is then placed on a hot plate at 90 degrees Celsius, which is ramped up to 120 degrees Celsius. Once the hot plate reaches 120 degrees Celsius, the glass slide is left on for 90 seconds. The glass slide is then allowed to cool for a few minutes before being placed under the photomask in a photomask aligner and exposure machine. The glass slide is exposed to ultraviolet radiation in two doses of 30 seconds each time with 30 seconds of non-exposure between the two doses, for a total dose of 700 mJ per $cm^2$. The glass slide is then placed in a beaker of positive photoresist developer and agitated until the exposed photoresist is developed away, leaving the unexposed photoresist. The glass slide is then washed with deionized water, blown dry with pressurized air, and placed back into the beaker of photoresist developer for 10-15 seconds to remove any residual exposed photoresist. The glass slide is subsequently removed from the beaker of photoresist developer, washed with deionized water, and blown dry with pressurized air.

In further embodiments, etching is used to create the electrodes and heating resistors, where a glass slide is placed in a beaker with a 1:1 mixture of 37% hydrochloric acid to deionized water and agitated for 10 minutes. After 10 minutes, the glass slide is removed from the beaker, washed with deionized water, and tested for conductance with a standard multimeter on the areas without photoresist. If areas without photoresist still have measurable conductance, the glass slide is placed back in the etching solution and agitated for another 5 minutes, then tested again. This process is repeated until the areas not covered by photoresist are not conductive. Lack of conductance indicates the removal of the indium tin oxide coating from these areas. The glass slide is then washed with acetone and then with isopropyl alcohol and blown dry with pressurized air.

According to embodiments of the current invention, the elastomer/rigid plate composite is bonded to the electrodes and resistors. In one example, the polystyrene-PDMS chip is bonded to the glass slide with patterned indium tin oxide resistors. This is accomplished by placing the two components in a plasma cleaner and plasma oxidizer to activate the surfaces to be bonded. The polystyrene-PDMS chip is plasma oxidized on the PDMS side and the glass slide is plasma oxidized on the side with the patterned indium tin oxide resistors. The two plasma oxidized surfaces are aligned and placed in contact with each other, then placed in an oven at 80 degrees Celsius for 1 hour to create a finished chip.

In one exemplary embodiment, a lower glass layer (bottom rigid layer 106) with patterned indium tin oxide resistors 110 is provided, where the resistors cause local heating with application of a voltage. Further provided is a layer of polydimethylsiloxane 104 having patterned channels 108 (the thermally expansive elastomer layer), a layer of polystyrene (top rigid layer 102).

Figure 5:
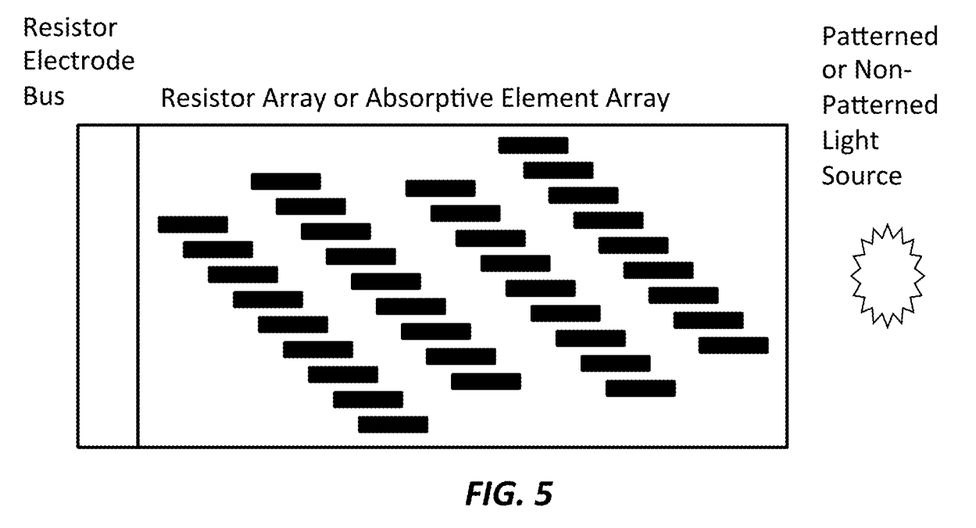
FIG. 5 shows an example of a pattern of resistors or heat absorptive elements that are actuated by applied voltage or a light source, respectively, according to embodiments of the current invention.

According to one aspect of the current invention, thermal heating is induced according to a resistive heating element, application of spatially patterned light, spatially patterned absorptive material in combination with non-patterned light, direct contact of a hot item, a channel containing a heated fluid, or a channel containing an exothermic chemical reaction (see FIG. 5).

Figure 4:
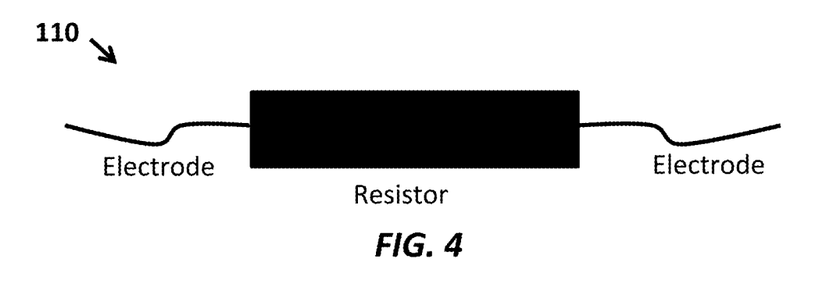
FIG. 4 shows an example of a single resistor.

FIG. 4 shows an example of a single resistor 110. FIG. 5 shows an example of a pattern of resistors 110 (this also represents spatially patterned absorptive material) in a rigid plate (102/106), where any one of the resistors are controlled using an electrode bus.

Figure 6A:
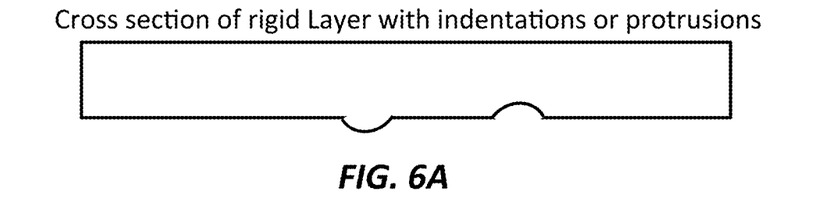
FIGS. 6A-6B show cross section views of the rigid plate (6A) and elastomeric layer (6B) having indentations or protrusions, according to embodiments of the current invention.
Figure 6B:
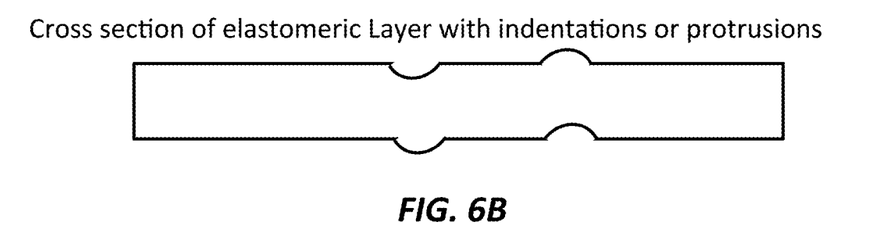

FIG. 6 shows a cross section view of the rigid plate (102/106) having indentations or protrusions. According to the current invention, rigid plate (102/106) are made of a material that can include glass, plastic, fiberglass, metals, silicon, ceramics, quartz, or a material that is stiffer than the planar elastomer layer.

For the embodiments shown in FIGS. 1C-1D anhd FIGS. 2C-2D, the channels 108 can be created in the elastomer layer 104 by casting the layer off a mold. In this example, a photomask is obtained that resembles the desired image of the mold. The mold is made by placing a silicon wafer in a sealed container containing a separate beaker of hexamethyldisilazane (HMDS) adhesion promoter for 5 minutes. Vapor adsorption results in an HMDS coating the wafer surface. Photoresist is then poured onto the silicon wafer. The silicon wafer is placed in a spinner and spun for 5 seconds at 500 rotations per minute before increasing to 1750 rotations per minute for an additional 30 seconds. This produces a layer of photoresist approximately 9-12 micrometers thick. The silicon wafer is then placed on a hot plate at 90 degrees Celsius which is ramped up to 120 degrees Celsius. Once the hot plate reaches 120 degrees Celsius, the silicon wafer is left on for 90 seconds. The silicon wafer is then allowed to cool for a few minutes before being placed under the photomask in a photomask aligner and exposure machine. The silicon wafer is exposed to ultraviolet radiation in two doses of 30 seconds each time with 30 seconds of non-exposure between the two doses, for a total dose of 700 mJ per cm$^2$. The silicon wafer is then placed in a beaker of positive photoresist developer and agitated until the exposed photoresist is developed away, leaving the unexposed photoresist. The silicon wafer is then washed with deionized water, blown dry with pressurized air, and placed back into the beaker of photoresist developer for 10-15 seconds to remove any residual exposed photoresist. The silicon wafer is subsequently removed from the beaker of photoresist developer, washed with deionized water, blown dry with pressurized air, and placed on a hot plate at 65 degrees Celsius that ramps at a rate of 10 degrees Celsius per hour to a final temperature of 190 degrees Celsius. The silicon wafer is removed from the hot plate 15 hours after it is first placed on the hot plate.

For casting the elastomer layer, the mold is placed in a vacuum-sealed container with a beaker of chlorotrimethylsilane for 10 minutes. This ensures the mold gets an even coating of chlorotrimethylsilane. The chlorotrimethylsilane forms a hydrophobic layer on the mold, which prevents polydimethylsiloxane (PDMS) from sticking to the mold in the next step. Next a well mixed and degassed mixture of 1 part crosslinker to 20 parts base PDMS (RTV615) is poured onto the mold. The mold is placed in a spinner and spun at 400 rotations per minute for 1 minute and 15 seconds for a final thickness of around 110 μm. The PDMS coated mold is subsequently placed on a flat surface for 30 minutes before being placed in an oven at 80 degrees Celsius for 1 hour.

For patterning the electrodes and heating resistors, a photomask is obtained that resembles the desired image of the patterned resistors. The patterned glass layer is fabricated by placing an indium tin oxide (ITO) coated glass slide in a sealed container with a beaker of HMDS for 5 minutes. This ensures the glass slide gets an even coating of HMDS on its surface. Photoresist is then poured onto the ITO coated side of the glass slide. The glass slide is placed in a spinner and spun for 5 seconds at 500 rotations per minute before increasing to 1800 rotations per minute for an additional 30 seconds for a final thickness of 9 μm. The glass slide is then placed on a hot plate at 90 degrees Celsius which is ramped up to 120 degrees Celsius. Once the hot plate reaches 120 degrees Celsius, the glass slide is left on for 90 seconds. The glass slide is then allowed to cool for a few minutes before being placed under the photomask in a photomask aligner and exposure machine. The glass slide is exposed to ultraviolet radiation in two doses of 30 seconds each time with 30 seconds of non-exposure between the two doses, for a total dose of 700 mJ per cm$^2$. The glass slide is then placed in a beaker of positive photoresist developer and agitated until the exposed photoresist is developed away, leaving the unexposed photoresist. The glass slide is then washed with deionized water, blown dry with pressurized air, and placed back into the beaker of photoresist developer for 10-15 seconds to remove any residual exposed photoresist. The glass slide is subsequently removed from the beaker of photoresist developer, washed with deionized water, and blown dry with pressurized air.

For etching to create the electrodes and heating resistors, the glass slide is placed in a beaker with a 1:1 mixture of 37% hydrochloric acid to deionized water and agitated for 10 minutes. After 10 minutes, the glass slide is removed from the beaker, washed with deionized water, and tested for conductance with a standard multimeter on the areas without photoresist. If areas without photoresist still have measurable conductance, the glass slide is placed back in the etching solution and agitated for another 5 minutes, then tested again. This process is repeated until the areas not covered by photoresist are not conductive. Lack of conductance indicates the removal of the indium tin oxide coating from these areas. The glass slide is then washed with acetone and then with isopropyl alcohol and blown dry with pressurized air.

Turning now to an example of bonding the glass slide to the elastomer layer. The cured PDMS coated silicon wafer and the patterned ITO coated glass slide are placed PDMS-side up and ITO coated side up, respectively, in a plasma cleaner and plasma oxidized (35 seconds exposure at 80 watts). The PDMS coated silicon wafer is plasma oxidized on the PDMS side and the glass slide is plasma oxidized on the side with the patterned ITO resistors. The two plasma oxidized surfaces are aligned and placed in contact with each other, then placed in an oven at 80 degrees Celsius for 1 hour. This completes the bonding of the glass slide to the PDMS layer on the PDMS coated silicon wafer. Once the assembly has bonded and cooled, it is removed from the wafer by slicing through the PDMS around the glass slide with a scalpel and peeling the glass slide and the area of the PDMS bonded to it from the wafer. This forms the complete elastomer/ITO/glass composite.

An example of bonding the elastomer/glass composite layer to the plastic layer includes trimming a polystyrene layer to the desired polystyrene chip size, ensuring that the edges are trimmed such that the polystyrene chip lays flat, and ports are drilled through the polystyrene to allow access to the flow channels. The elastomer/glass composite layer (PDMS side up) and the polystyrene chip are then placed in a plasma cleaner and plasma oxidized. The elastomer/glass composite layer is plasma oxidized on the PDMS side. Then, the PDMS side of the elastomer/glass composite layer is coated with 2% (3-Aminopropyl)triethoxysilane (APTES) in water solution for 20 minutes. Concurrently, the polystyrene chip is treated with a 2% (3-Glycidyloxypropyl) trimethoxysilane (GPTS) in water solution for 20 minutes. After 20 minutes the elastomer/glass composite layer and the chip are washed with DI water and blown dry with pressurized air. The PDMS side of the elastomer/glass composite layer is placed against the GPTS treated side of the polystyrene chip, and the assembly is placed in an oven at 80 degrees Celsius for 2 or more hours. This completes the example of bonding of the layers, forming the complete chip.

Alternatively, the elastomer layer can be cast directly on a rigid substrate. In this example, liquid uncured elastomer is first poured on the rigid substrate. The mold, which may be flat, or may contain channels or features, is then clamped with flat or featured side in contact with the uncured elastomer, to the rigid layer. The assembly is allowed to cure, and then the mold is peeled off the cured elastomer layer and rigid layer, resulting in an elastomer layer bonded to a rigid layer. The height of the resulting elastomer layer can be controlled with spacer elements of the desired height, which can be independent of, or part of, the mold. In this example, the rigid layer may be a printed circuit board.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example one or both rigid substrates can printed circuit boards which can include patterned carbon resistors, or resistive alloy resistors.

The thickness of the thermally expansive layer can be controlled by spin coating, scraping to desired thickness, pouring a metered volume of liquid elastomer which subsequently cures, or by compressing liquid elastomer to the desired height before curing.

Bonding the elastomer layer to one or more of the more rigid substrates can be accomplished by curing directly on the rigid substrate, application of an adhesive, chemical bonding, surface activation (for example by plasma oxidation), and by bonding silicone coated layers with a mismatch in base to crosslinker ratio.

Ports can be incorporated during any of the casting processes by including them in the mold, or through subtractive processes such as cutting, drilling, etching, or ablation.

All such variations are considered to be within the scope and spirit of the present invention as defined by the following claims and their legal equivalents.

What is claimed:

1. A fluid valve, comprising:
    a) a first rigid planar substrate comprising a smooth surface or a surface having indentations or protrusions;
    b) a second rigid planar substrate comprising a smooth surface or a surface having indentations or protrusions;
    c) a planar thermally expandable elastomeric layer comprising a first side disposed between said first rigid planar substrate surface and a second side disposed on said second rigid planar substrate surface, wherein said planar thermally expandable elastomeric layer comprises a first state at a first temperature and a second state at a second temperature, wherein said second temperature is greater than said first temperature according to heat input from a heat source disposed in an on-state, wherein said second state is a thermally expanded state relative to an unexpanded first state, wherein said first planar substrate and said second planar substrate are more rigid than said planar thermally expandable elastomeric layer, wherein at least one of said planar thermally expandable elastomeric layer, said first planar substrate, or said second planar substrate comprises a fluid channel, wherein said fluid channel is closed or partially closed when said planar thermally expandable elastomeric layer is in said second thermally expanded state, wherein said fluid channel is open when said planar elastomeric layer is in said first state, wherein when said heat source is disposed in an off-state said input heat in said thermally expansive elastomer dissipates and returns said thermally expansive elastomer to said first state, wherein said first state and said second state are reversible states within a single said fluidic valve.

2. The fluidic valve of claim 1, wherein said first planar substrate or said second planar substrate comprises a pattern of resistors, wherein said resistors are disposed to provide local heating with application of a voltage, wherein said planar elastomeric layer is placed in a locally expanded state according to said local heating, wherein said fluid channel is filled with material from said elastomeric layer.

3. The fluidic valve of claim 2, wherein said resistors are selected from the group consisting of indium tin oxide resistors, printed carbon resistors, etched thin film resistors, and resistive alloy resistors.

4. The fluidic valve of claim 1, wherein said elastomeric layer comprises an elastomer selected from the group consisting of silicone, urethane, thermoplastic elastomer, fluoroelastomer, fluorosilicone, and rubber, wherein said silicone comprises polydimethylsiloxane.

5. The fluidic valve of claim 1, wherein said first planar substrate or said second planar substrate are selected from the group consisting of glass, plastic, fiberglass, metals, silicon, ceramics, quartz, and a material that is stiffer than said planar elastomeric layer.

6. The fluidic valve of claim 1, wherein said second thermal state is induced according to a resistive heating element, application of spatially patterned light, spatially patterned absorptive material in combination with patterned or non-patterned light, direct contact of a hot item, a channel containing a heated fluid, or a channel containing an exothermic chemical reaction.

* * * * *

UNITED STATES PATENT AND TRADEMARK OFFICE
CERTIFICATE OF CORRECTION

PATENT NO. : 10,527,193 B2  
APPLICATION NO. : 15/589477  
DATED : January 7, 2020  
INVENTOR(S) : Nate Cira et al.

Page 1 of 1

It is certified that error appears in the above-identified patent and that said Letters Patent is hereby corrected as shown below:

In the Specification

Column 1, Line 9 Please add:
STATEMENT OF GOVERNMENT SPONSORED SUPPORT
This invention was made with Government support under contract TR001085 awarded by the National Institutes of Health. The Government has certain rights in the invention.

Signed and Sealed this  
Twenty-third Day of December, 2025

John A. Squires  
*Director of the United States Patent and Trademark Office*